United States Patent [19]
Smith

[11] 3,891,099
[45] June 24, 1975

[54] MATERIAL STORAGE AND TRANSFER DEVICE

[75] Inventor: Gordon C. Smith, Richfield, Ohio

[73] Assignee: Glaus, Pyle, Schomer, Burns and DeHaven, Inc., Akron, Ohio

[22] Filed: Jan. 31, 1974

[21] Appl. No.: 438,342

[52] U.S. Cl. .............................. 214/17 DA; 198/59
[51] Int. Cl. ............................................ B65g 65/44
[58] Field of Search ......... 214/17 DA, 17 D, 23–25; 198/59

[56] References Cited
UNITED STATES PATENTS

| | | | |
|---|---|---|---|
| 2,562,427 | 7/1951 | Hurter | 214/17 DA |
| 3,049,250 | 8/1962 | Dempster et al. | 214/82 |
| 3,515,293 | 6/1970 | Cain | 214/23 |
| 3,642,153 | 2/1972 | Adler et al. | 214/17 DA |

*Primary Examiner*—Robert G. Sheridan
*Attorney, Agent, or Firm*—Hamilton, Renner & Kenner

[57] ABSTRACT

Disclosed is an apparatus for the storage and controlled transfer of material, particularly refuse or other generally non-flowable materials. A storage bin or pit which receives the material communicates with an outfeed conveyor, but the material is not permitted to rest directly on the conveyor. Rather, the material is transferred from the bin to the conveyor by at least one pusher assembly which, in the preferred form, is capable of moving material from the bin to various points along the conveyor for the discharge thereof from the bin.

12 Claims, 6 Drawing Figures

FIG. I

MATERIAL STORAGE AND TRANSFER DEVICE

BACKGROUND OF THE INVENTION

This invention relates to a material storage and transfer device wherein desired amounts of material can be removed from various locations in a storage bin to an outfeed conveyor. More particularly, this invention relates to a system whereby material, particularly refuse or material which will not always flow well by gravity, is stored in a bin and selectively transferred to a conveyor which moves the material from the bin to other work areas.

Many industries have the need to store large quantities of material for subsequent controlled use. Often this material is stored in large bins which have a conveyor at the bottom thereof to move the material from the bin to other work areas. When the material freely flows by gravity onto the conveyor, such as would occur with dry sand, grain or the like, such a system is usually satisfactory. But when the material is not free flowing, such as municipal refuse, wood chips, bark or the like, the material in the bin will tend to hollow out above or otherwise bridge over the conveyor rendering the system inoperative or inefficient.

Moreover, where the material is piled directly onto a take-away conveyor, additional problems are encountered. For example, if the conveyor should break down or be damaged by a heavy object dropping thereon, the whole system must be shut down and usually the bin unloaded to obtain access to conveyor to rectify the problem. Such down time is detrimental to systems, such as urban refuse incineration systems, where continual operation of steam generators or the like is imperative. Further, the conveyors used for these types of systems must be extremely strong and when conventional apron or chain drag conveyors are used for large bins to move the material long distances directly through the entire storage pile, a great tension must be maintained on the drive chains thereof which is highly impractical.

More recently shuffle type conveyors have been developed which utilize a series of rams to reciprocate and move the material along bit by bit. While some types of these conveyors are more practical for use at the bottom of bins or pits, many would not be capable of efficient operation where material must be moved quickly over long distances. In addition, these conveyors would not be practical where material must be transferred from flat bottomed storage piles with large areas.

SUMMARY OF THE INVENTION

It is thus a primary object of the present invention to provide a material storage and transfer device capable of handling a material which has a tendency not to flow freely by overcoming and eliminating the adverse bridging tendency thereof.

It is another object of the present invention to provide a material storage and transfer device, as above, in which the stored material is not directly placed on the transfer or conveying apparatus.

It is still another object of the present invention to provide a material storage and transfer device, as above, in which the conveying apparatus therefor can be readily serviced without removing the stored material.

It is yet another object of the present invention to provide a material storage and transfer device, as above, in which the conveying apparatus is protected from objects being directly dropped thereon.

It is a further object of the present invention to provide a material storage and transfer device, as above, which can utilize as its conveying apparatus, conventional apron or chain drag conveyors.

It is an additional object of the present invention to provide a material storage and transfer device as above which will continually feed material at a controlled rate to a process line, system or other work area.

These and other objects of the present invention, which will become apparent from the description to follow, are accomplished by the improvements hereinafter described and claimed.

In general, the apparatus for storing material and systematically transferring that material out of the storage area includes a bin or pit into which the material is placed. An output conveyor is located generally centrally of and at the bottom of the bin to transfer material longitudinally therealong and out of the bin. The conveyor is substantially shielded from the material so that material in the bin does not have direct contact therewith, the shield extending over the conveyor but not closing the conveyor off from the material in the bin. The material may then be selectively transferred to the conveyor at various points along the longitudinal or conveying direction thereof.

In the preferred embodiment, located along at least one side of the bin is a pusher assembly which communicates with the material near the bottom of the bin. The bin is longitudinally divided into a series of bays each of which provide access for the pusher assembly through the side of the bin. The pusher assembly can be moved longitudinally along the bin and selectively located at any of the bays. Then the pusher assembly can be activated to extend into the bin to transfer material onto the conveyor.

DESCRIPTION OF THE PREFERRED EMBODIMENT

Figure 1:
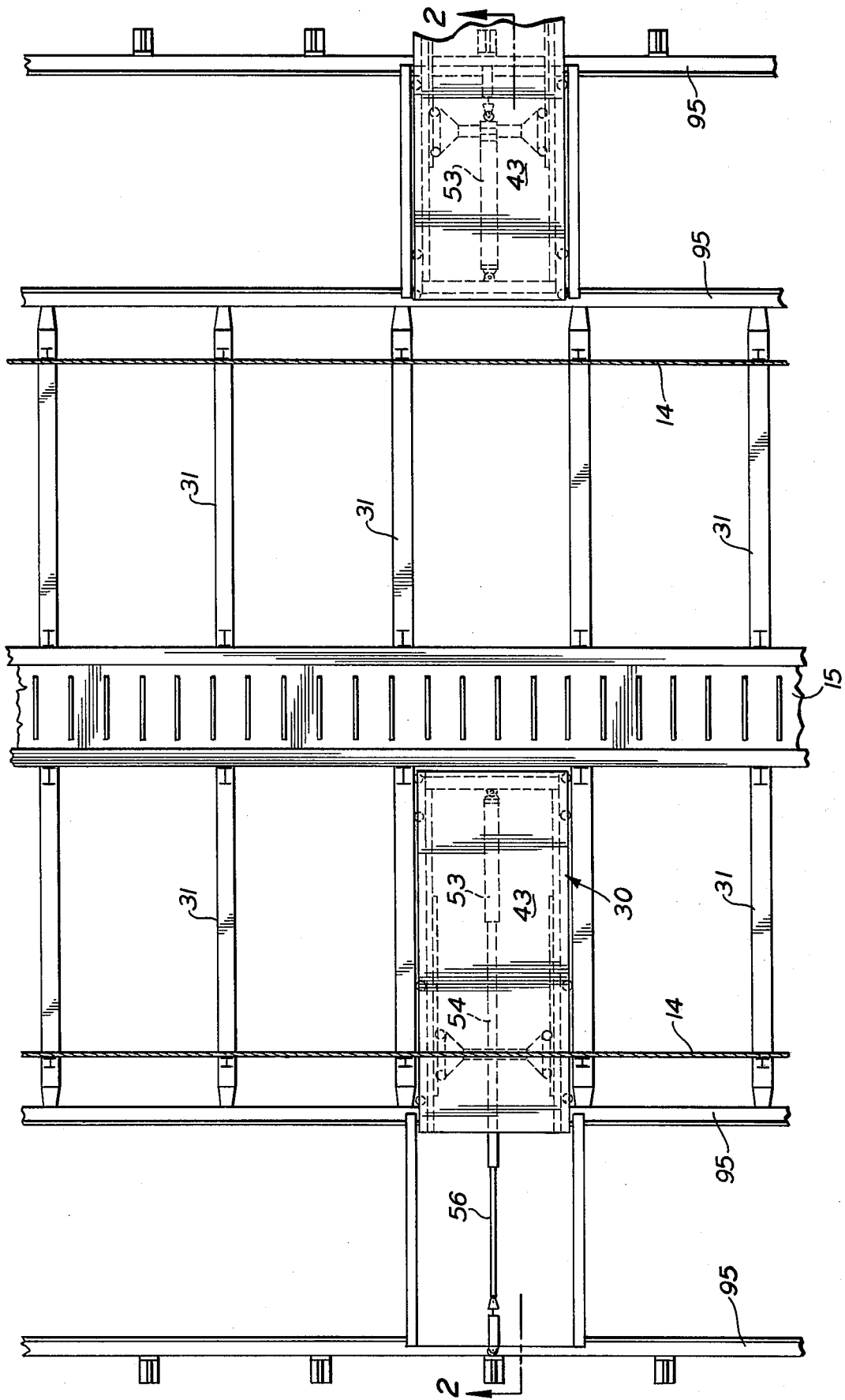
FIG. 1 is a sectioned partial top plan view taken substantially along line 1—1 of FIG. 2.
Figure 2:
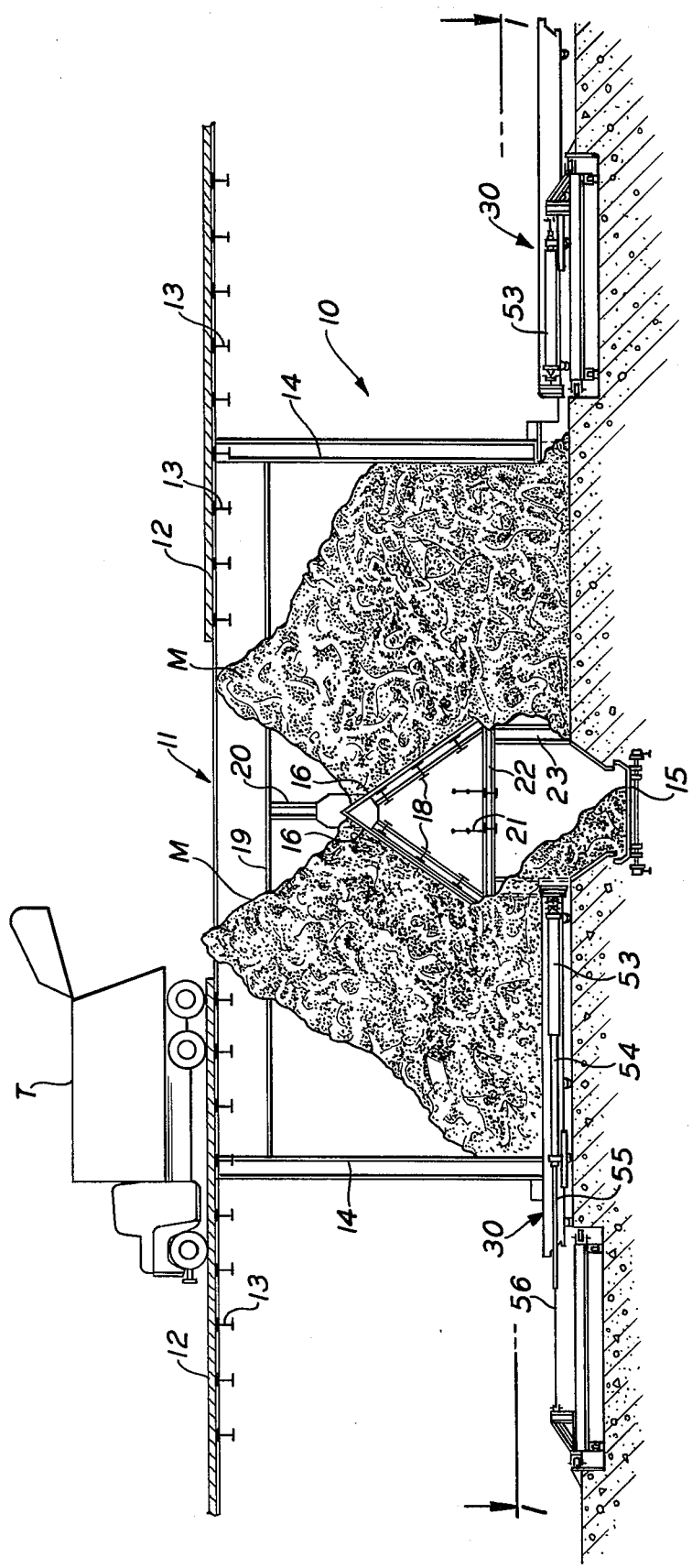
FIG. 2 is a sectioned elevational view taken substantially along line 2—2 of FIG. 1.

Apparatus for the storage and transfer of a material M is indicated generally by the numeral 10 in FIGS. 1 and 2. The exact nature of the material M is unimportant to this invention; however, it is contemplated that the invention is well suited for non-flowable and generally inconsistent materials. Urban refuse either in its raw or shredded form is a typical nonflowable material and is often stored for subsequent burning to produce steam. Thus, for purposes of describing the preferred embodiment, the material M will be considered to be refuse.

The refuse material M is preferably dumped, as from a truck T, into a bin or pit indicated generally by the numeral 11. Bin 11 can be located above the ground with the truck T driving up a ramp and onto an overhang 12, reinforced by I-beams 13, to dump the material or it can be located in the ground with the overhang 12 then generally being at ground level. In either event, bin 11 will generally be rectangular in shape having longitudinally extending sidewalls 14 with end walls (not shown) generally closing the bin to maintain the material M therein.

Running generally longitudinally from end to end along bin 11 is take-away conveyor 15 which is shown somewhat schematically in FIGS. 1 and 2. Conveyor 15 can be of any conventional type, such as an apron or chain drag conveyor, which will adequately move heavy material out of bin 11 to another work area, such as a furnace in the case of refuse material.

A hood 16, reinforced by I-beams 18, is suspended from a crossbeam 19, as by bracket 20, over conveyor 15 to shield the conveyor from direct contact with the material M. Hood 16 thus permits the selection of a conveyor which need not be capable of withstanding the force of large objects being directly dropped over a large distance thereon and which need not be of sufficient strength to withstand the weight of an entire bin of material. In addition, hood 16 assures ready access to the conveyor for maintenance purposes. For observation purposes, a catwalk 21 may be provided under hood 16 and mounted on crossbeam 22 supported by vertical stanchions 23.

Figure 3:
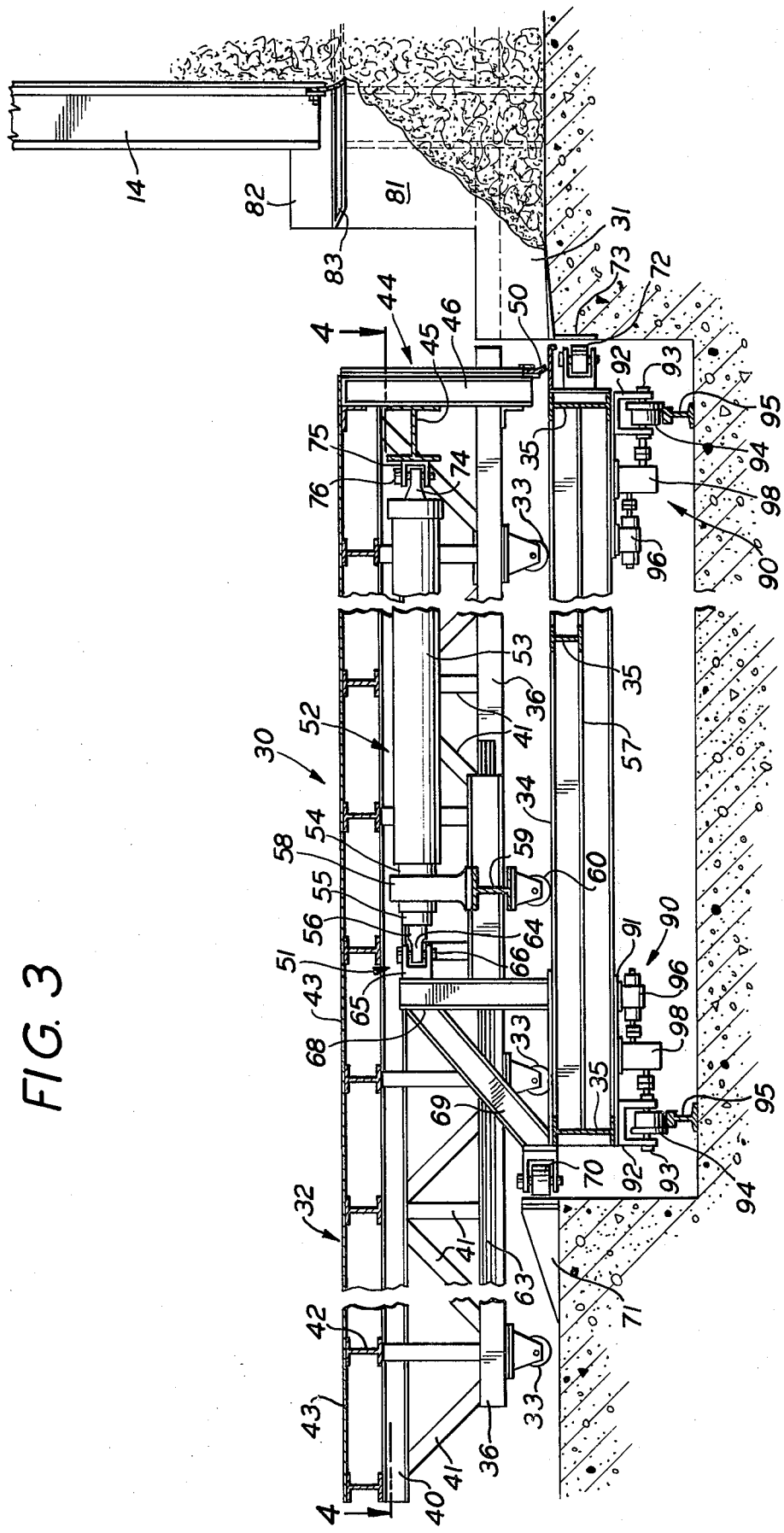
FIG. 3 is a sectioned elevational view of the pusher assembly shown in FIGS. 1 and 2 and taken substantially along line 3—3 of FIG. 4.
Figure 4:
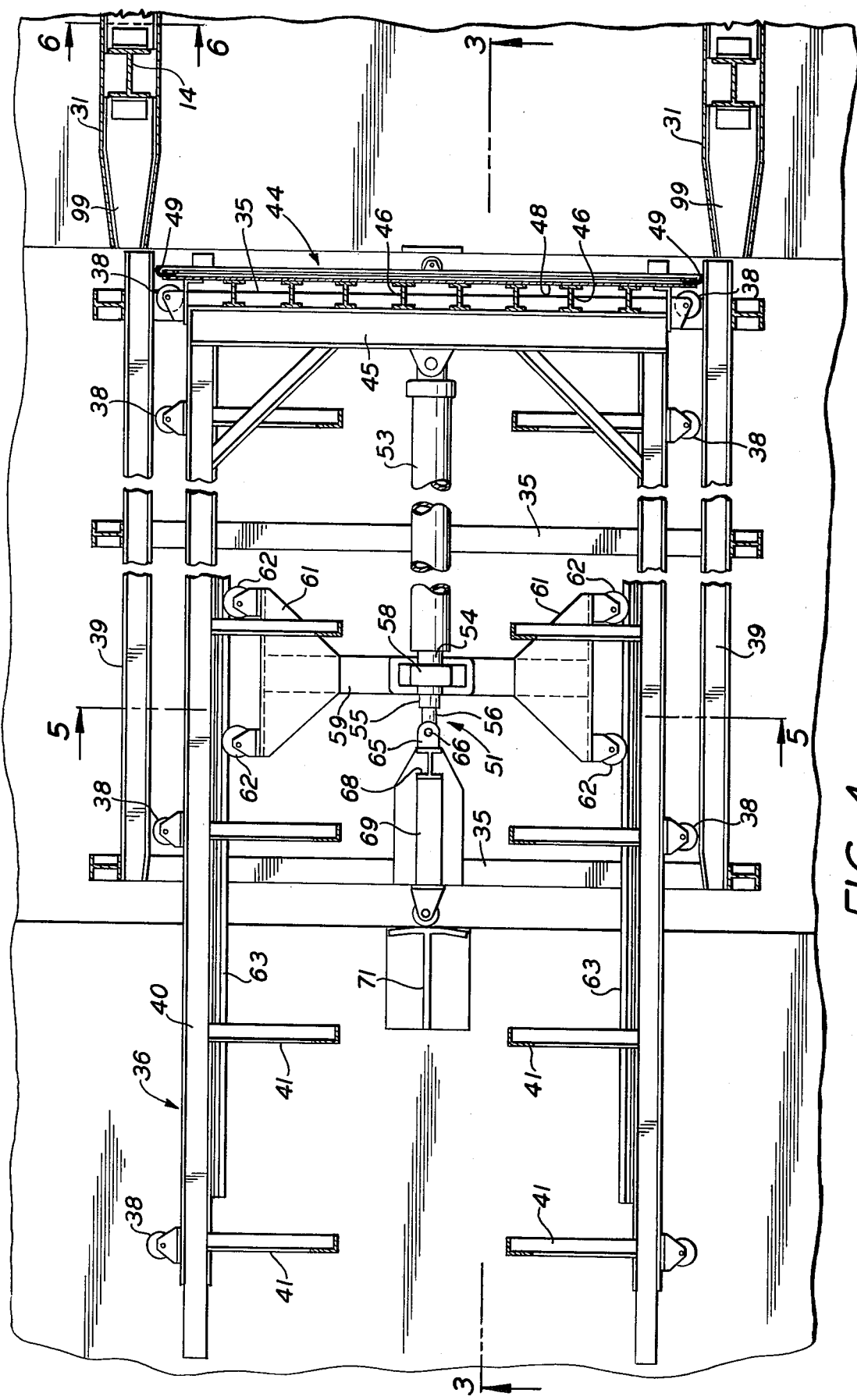
FIG. 4 is a sectioned top plan view of the pusher assembly taken substantially along line 4—4 of FIG. 3.
Figure 5:
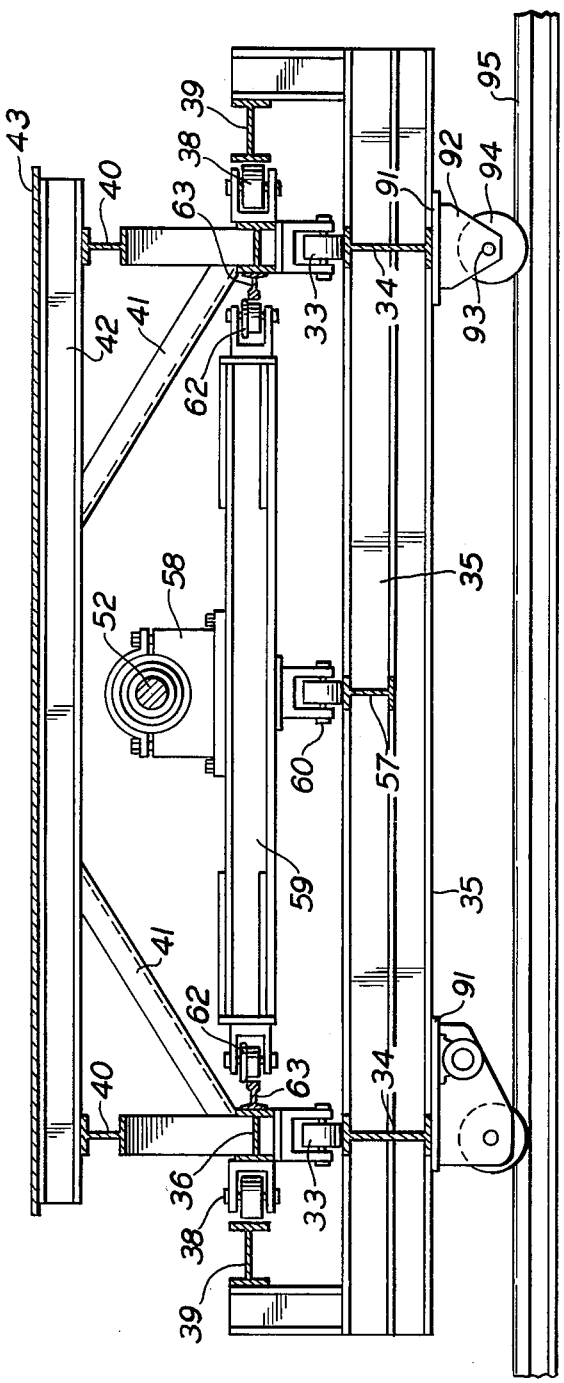
FIG. 5 is a sectional view taken substantially along line 5—5 of FIG. 4.

In order to transfer the refuse material M from the bin 11 to the conveyor 15 there is provided at least one pusher assembly generally indicated by the numeral 30 and shown in detail in FIGS. 3 and 4. As shown in FIGS. 1 and 2, and as will hereinafter be described in detail, it is preferable that there be at least one pusher assembly 30 on each side of bin 11. However, it is possible, without departing from the spirit of this invention, to provide a pusher assembly only on one side of the bin in which case the conveyor would probably be located near the side of the bin away from the pusher assembly rather than centrally of the bin as is shown herein.

Bin 11 is divided along its longitudinal extent by a series of pusher guide beams 31 which form bays through which the pusher assembly 30 travels. Each pusher assembly includes a movable ram or carriage structure, indicated generally by the numeral 32. Carriage 32 is mounted on casters 33 which ride on side rails 34 mounted between I-beams 35 during its movement into and out of bin 11. Casters 33 are carried by lower support bars 36 of carriage 32 which also support guide rollers 38 which bear on rails 39 and guide beams 31 to align carriage 32 laterally during its transfer motion. Carriage 32 also includes upper support bars 40 separated from lower support bars 36 by a plurality of structural latticework, all indicated by the numeral 41. A plurality of I-beams 42 extend between support bars 40 and carry a cover plate 43 which protects carriage 32 from the material M when the carriage is in its extended position.

Closing off the front of carriage 32 is a pusher face, indicated generally by the numeral 44, which includes a cross I-beam 45 extending between upper support bars 40 to which is mounted a plurality of reinforcing I-beams 46 that support a face plate 48. Vertical seal strips 49 are fixed to the sides of face plate 48 to prevent material from filtering within carriage 32 in a manner to be hereinafter described. Another gasket-like seal or wiper 50 may also be provided to ride on the floor of bin 11. Thus, as the carriage structure 32 moves laterally into bin 11 through the sidewall 14 thereof, pusher face 44 moves material toward conveyor 15 with substantially straight line movement being assured by the guiding effect of rollers 38 on beams 39 and 31.

Each pusher assembly 30 also includes a stationary drive mechanism, generally indicated by the numeral 51, which provides the motive force to the carriage structure 32. The primary component of the drive mechanism 51 is a double acting telescoping hydraulic cylinder 52 having an outer casing 53 and sections 54, 55 and 56, cylinder 52 on the left side of FIG. 2 being shown in its extended position. Cylinder 52 is supported near its midpoint by a clamp block 58 mounted on cylinder section 54 and supported by an I-beam 59 carried by roller 60 which rides on center rail 57. A web member 61 is mounted on each end of I-beam 59 and carries flanged rollers 62 which ride on rails 63 mounted on the inside of each bar 36, thus providing relative movement between cylinder section 54 and carriage 32 in a manner to be hereinafter described.

Section 56 of cylinder 52 terminates in an eye 64 which is received by a clevis 65 and locked thereto by pin 66. Clevis 65 is mounted on an I-beam 68 so that as cylinder 52 is extended, the thrust is transmitted to a piston support bracket 69 mounted on rail 57 and beam 35, through a caster 70 and into a stationary thrust block 71 suitably anchored into the concrete floor. As the cylinder is retracted, the force is transmitted from the support bracket 69, through rail 57 and to a caster 72 mounted on I-beam 35. Caster 72 bears against a plate 73 which can be embedded in the concrete floor.

The front of cylinder 52 is provided with an eye 74 which is received by a clevis 75 and locked thereto, as by pin 76. Clevis 75 is fixed to I-beam 45 so that movement of the cylinder 52 moves the carriage 32 in the following manner. FIGS. 3 and 4 as well as the right side of FIG. 2, depicts a pusher assembly 30 in its fully retracted position. Actuation of cylinder 52 from suitable fluid supplies, by pumps, motors and the like (not shown) causes cylinder section 53 to move to the right in FIGS. 3 and 4 causing relative movement between carriage 32 and cylinder 52. Thus, rail 63 moves while rollers 62 remain stationary. Then as cylinder section 53 reaches the limit of its travel and sections 54, 55 and 56 are expanded, cylinder section 54 moves on roller 60 along with carriage 32 such that the relative position of rollers 62 and rail 63 remains unchanged. During this time, the carriage is moving inwardly through sidewall 14 of bin 11 on rollers 33 being guided laterally by the action of rollers 38 first on rails 39 and later guide beams 31. Material is thereby pushed by face 44 onto conveyor 15 as shown by the fully extended cylinder 52 on the left side of FIG. 2. Material will not penetrate the interior of pusher assembly 30, however, because of cover plate 43 and seals 49 and 50 on face 44.

Figure 6:
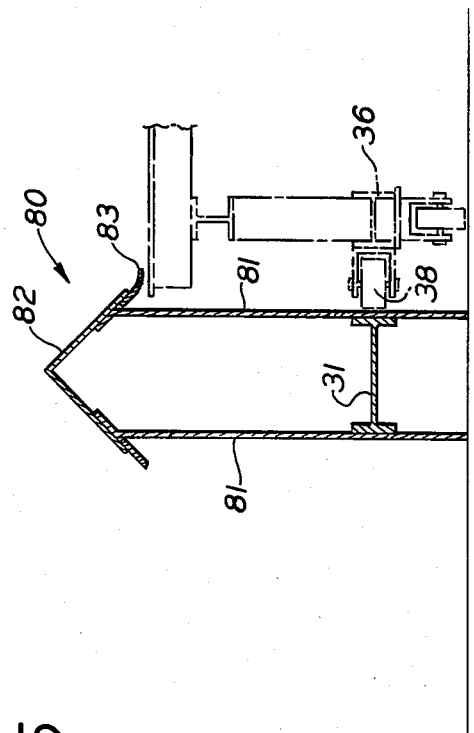
FIG. 6 is a sectional view taken substantially along line 6—6 of FIG. 4 and showing an extended pusher assembly in phantom.

Nor can material filter down between guide beams 31 and the pusher assembly because of the peaked hoods, indicated generally by the numeral 80 and shown in FIG. 6. Guide beam 31 is enclosed, along its entire length, by vertically extending side plates 81 which support a hood or cover 82. The lower overhanging edges of cover 82 are provided with seals or wipers 83 which ride on cover plate 43 to keep material from filtering around the edge of the extended pusher assembly 30, as shown in phantom in FIG. 6. In addition, seals 49 on face plate 48 wipe along side plates 81 as the pusher moves forward.

As previously described, it is preferable to have at least one pusher assembly 30 situated on each side of a bin 11. In such a situation, the assemblies 30 may be synchronized and controlled by conventional electric and hydraulic means (not shown) so that as one assembly is being retracted the opposite assembly is advancing to continuously provide material M to the conveyor 15 at a controlled rate. The reciprocating action of pusher assemblies 30 will also create sufficient turbulence beneath the material to deter any undesirable bridging of the material.

While it would be possible to provide a plurality of pusher assemblies on each side of bin 11, as for example one pusher for each bay defined by guide beams 31, without departing from the spirit of this invention, the pusher assemblies 30 depicted herein are shown as being movable longitudinally along the side of bin 11 in a manner now to be described in detail.

As best shown in FIGS. 1 and 3, each pusher assembly is provided with apparatus to transfer the carriage assembly along the bin generally indicated by the numeral 90 and including support plates 91 fixed to rails 34 and I-beams 35 which carry wheel mountings 92 that support axles 93 of flanged wheels 94. Wheels 94 ride on rails 95 which extend longitudinally along bin 11. When the material is substantially emptied from the portion of the bin defined by a particular bay between adjacent guide beams 31, the pusher assembly 30 is fully retracted clear of the bin and thus supported on and over the transfer carriage assembly as shown in FIG. 3. In this position, limit switches (not shown) would permit actuation of transfer carriage motors 96, carried by plate 91, to drive wheels 94, through suitable gear reducers 98, slowly to move the entire pusher assembly longitudinally on rails 95 to the next bay area or other preselected position. When the next or desired bay is reached, another limit switch (not shown) can be contacted to stop the transfer carriage motors and thereby position the pusher assembly for further operation. In this manner, the pusher assemblies can be selectively located at any desired point along the bin to transfer the material to the outfeed conveyor at various points along its conveying direction. In the event that the electrical operation is such that perfect alignment of the pusher assembly and guide bars 31 is not obtained, the edges 99 of guide bars 31 can be tapered as shown in FIG. 4 to correct for slight positioning errors.

Of course, it is understood that the hydraulic equipment, that is, the pump, oil reservoir and the like, would be included with each pusher assembly 30 and the electric power required to operate the pump as well as transfer motors 96 and the like could be derived from a conventional system of stationary conductors running the length of the bin 11 with the current being picked up by the transfer carriage in a conventional manner. Numerous equivalent means of providing the power source could be employed.

It should be evident that in addition to those already discussed numerous other departures can be made from the preferred embodiment shown without departing from the concept of the present invention. For example, each carriage, instead of consisting of a single pusher face could consist of a plurality of tiered pusher faces separated by stationary decks fixed between the guide beam side plates 81 of beams 31 which separate the bays. In such instances the pusher travel could be considerably shortened thus obviating the need for a telescoping hydraulic cylinder and thus less land area would be needed to operate the system without losing any volume of storage. Thus, the system described herein is capable of a wide variety of uses dependent on the particular need involved. Material can be stored in the bin for subsequent controlled removal to a take-away conveyor at any point along its length without creating an adverse bridging effect thereby substantially improving the material storage and transfer art.

I claim:

1. A material storage and transfer system comprising, storage means extending in a longitudinal direction for receiving quantities of material, conveying means extending in said longitudinal direction receiving material from said storage means and transferring the material out of said storage means, means to transfer the material from said storage means to said conveying means, said means to transfer including at least one pusher assembly located at each side of and outside of said storage means when in a retracted position and movable laterally into said storage means when in an extended position, and a plurality of adjacent guide means dividing said storage means into bays along said longitudinal direction, said pusher assembly being located within a bay between adjacent guide means thereby being operable to move the material to said conveying means at various points along said longitudinal direction.

2. A system according to claim 1 further comprising means to move said pusher assembly from bay to bay in said longitudinal direction.

3. A system according to claim 1 wherein said storage means includes a bin, said conveying means being a conveyor located generally centrally of said bin near the bottom thereof.

4. A system according to claim 3 further comprising hood means mounted within said bin generally above said conveyor for protecting said conveyor from the material and preventing the material from being placed directly on said conveyor.

5. A system according to claim 3 further comprising means to prevent the material in said bin from filtering between said guide means and said pusher assembly.

6. A system according to claim 3 wherein said means to move said pusher assembly includes drive means, and at least one rail member extending along said bin from bay to bay, said pusher assembly including wheels adapted to ride said rail, said drive means moving said wheels on said rail.

7. A system according to claim 1, said pusher assembly including a movable carriage and a drive mechanism, said carriage being movable with respect to said drive mechanism.

8. A system according to claim 7 wherein said carriage includes a cover plate protecting said drive mechanism from the material and a pusher face contacting the material.

9. A material storage and transfer system comprising, storage means for receiving quantities of material, conveying means receiving material from said storage means and transferring the material out of said storage means, a pusher assembly capable of being extended into said storage means to push material onto said conveying means, said pusher assembly being operable to move the material to said conveying means at various points along the conveying direction of said conveying means and including a movable carriage as well as a drive mechanism, said carriage being movable with respect to said drive mechanism and including a cover plate protecting said drive mechanism from the material and further including a pusher face contacting the material, and guide means extending laterally of said conveying direction to divide said storage means into bays, said carriage including means riding on adjacent of said guide means when said pusher assembly is extended into said storage means.

10. A system according to claim 9 wherein said drive mechanism includes a hydraulic cylinder, said pusher face of said carriage being mounted on said cylinder.

11. A system according to claim 10 wherein said cylinder is telescoping having a plurality of movable sections, at least one of said sections being movable with respect to said carriage and at least another of said sections being movable with said carriage.

12. A system according to claim 11 further comprising means to mount one of said sections of said cylinder for movement with respect to said carriage.

* * * * *